United States Patent
Romero et al.

(10) Patent No.: US 7,748,005 B2
(45) Date of Patent: *Jun. 29, 2010

(54) SYSTEM AND METHOD FOR ALLOCATING A PLURALITY OF RESOURCES BETWEEN A PLURALITY OF COMPUTING DOMAINS

(75) Inventors: Francisco Romero, Plano, TX (US); Cliff McCarthy, Richardson, TX (US); Scott Rhine, Frisco, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1625 days.

This patent is subject to a terminal disclaimer.

(21) Appl. No.: 10/938,961

(22) Filed: Sep. 10, 2004

(65) Prior Publication Data

US 2005/0039183 A1     Feb. 17, 2005

Related U.S. Application Data

(63) Continuation-in-part of application No. 10/206,594, filed on Jul. 26, 2002, now Pat. No. 7,140,020, which is a continuation-in-part of application No. 09/493,753, filed on Jan. 28, 2000, now Pat. No. 7,228,546.

(51) Int. Cl.
*G06F 9/46* (2006.01)
*G06F 15/173* (2006.01)

(52) U.S. Cl. .................. 718/104; 718/102; 718/103; 709/226

(58) Field of Classification Search ............. 718/100, 718/102, 104, 103; 709/226
See application file for complete search history.

(56) References Cited

U.S. PATENT DOCUMENTS

| | | | | |
|---|---|---|---|---|
| 5,506,975 A | * | 4/1996 | Onodera | 718/1 |
| 5,537,542 A | * | 7/1996 | Eilert et al. | 709/201 |
| 5,594,726 A | * | 1/1997 | Thompson et al. | 370/485 |
| 5,675,739 A | * | 10/1997 | Eilert et al. | 709/226 |
| 5,961,596 A | * | 10/1999 | Takubo et al. | 709/224 |
| 6,011,804 A | * | 1/2000 | Bertin et al. | 370/468 |
| 6,081,826 A | * | 6/2000 | Masuoka et al. | 718/100 |
| 6,330,586 B1 | * | 12/2001 | Yates et al. | 709/201 |
| 6,393,455 B1 | * | 5/2002 | Eilert et al. | 718/105 |
| 6,681,232 B1 | * | 1/2004 | Sistanizadeh et al. | 707/104.1 |
| 6,694,419 B1 | * | 2/2004 | Schnee et al. | 711/173 |
| 6,738,886 B1 | * | 5/2004 | Mendoza et al. | 711/173 |
| 6,775,825 B1 | * | 8/2004 | Grumann et al. | 717/127 |
| 6,859,926 B1 | * | 2/2005 | Brenner et al. | 718/100 |
| 6,922,774 B2 | * | 7/2005 | Meushaw et al. | 713/151 |
| 6,961,941 B1 | * | 11/2005 | Nelson et al. | 719/319 |
| 6,993,762 B1 | * | 1/2006 | Pierre | 718/102 |

(Continued)

FOREIGN PATENT DOCUMENTS

JP     2002-041304     2/2002

*Primary Examiner*—Meng-Ai An
*Assistant Examiner*—Caroline Arcos

(57) ABSTRACT

In an embodiment, a computing system comprises a plurality of resources, a first manager process for allocating the plurality of resources on a dynamic basis according to service level parameters, and a plurality of computing domains, wherein at least one application, a respective second manager process, and a respective performance monitor process are executed within each computing domain, and wherein the performance monitor generates performance data related to the execution of the at least one application and the second manager process requests additional resources from the first manager process in response to analysis of performance data in view of at least one service level parameter.

20 Claims, 5 Drawing Sheets

U.S. PATENT DOCUMENTS

| | | | |
|---|---|---|---|
| 7,096,248 B2 * | 8/2006 | Masters et al. | 709/201 |
| 7,171,654 B2 * | 1/2007 | Werme et al. | 717/130 |
| 7,181,743 B2 * | 2/2007 | Werme et al. | 718/104 |
| 7,191,440 B2 * | 3/2007 | Cota-Robles et al. | 718/1 |
| 7,203,941 B2 * | 4/2007 | Demsey et al. | 718/1 |
| 7,272,831 B2 * | 9/2007 | Cota-Robles et al. | 718/1 |
| 7,281,249 B2 * | 10/2007 | Tarui et al. | 718/102 |
| 7,356,817 B1 * | 4/2008 | Cota-Robles et al. | 718/1 |
| 7,433,951 B1 * | 10/2008 | Waldspurger | 709/226 |
| 2002/0049841 A1 * | 4/2002 | Johnson et al. | 709/225 |
| 2002/0169987 A1 * | 11/2002 | Meushaw et al. | 713/201 |

* cited by examiner

| REQUESTS | | CUMULATIVE ALLOCATIONS OF 19 RESOURCES | | | | | |
|---|---|---|---|---|---|---|---|
| | PRIORITY | BOX 316 | PRIORITY | | | | |
| PARTITIONS | 1 2 3 4 | | 1 | 2 | 3 | 4 (1) | 4 (3) |
| 1 | 1 1 1 3 | 1 | 1 | 1 | 1 | 1 | [3] |
| 2 | 0 3 4 5 | 1 | 1 | 3 | 4 | 4 | 4 |
| 3 | 2 4 4 4 | 1 | 2 | 4 | 4 | [4] | 4 |
| 4 | 0 0 0 3 | 1 | 1 | 1 | 1 | 1 | [3] |
| 5 | 2 3 4 5 | 1 | 2 | 3 | 4 | 4 | 4 |
| 6 | 1 1 1 1 | 1 | 1 | 1 | 1 | [1] | 1 |
| CUMULATIVE TOTALS | 6 12 14 21 | 6 | 8 | 13 | 15 | 15 | 19 |
| | | 401 | 402 | 403 | 404 | 405 | 406 |

| REQUESTS | | CUMULATIVE ALLOCATIONS OF 24 RESOURCES | | | | | | | |
|---|---|---|---|---|---|---|---|---|---|
| | PRIORITY | BOX 316 | PRIORITY | | | | | | |
| PARTITIONS | 1 2 | | 1 | 2 (1) | 2 (2) | 2 (3) | 2 (4) | 2 (5) | 2 (8) |
| 1 | 1 9 | 1 | 1 | 1 | 2 | 3 | 4 | 5 | 6.5 |
| 2 | 1 8 | 1 | 1 | 1 | 2 | 3 | 4 | 5 | 6.5 |
| 3 | 4 5 | 1 | 4 | 4 | 4 | 4 | 4 | [5] | 5 |
| 4 | 1 2 | 1 | 1 | 1 | [2] | 2 | 2 | 2 | 2 |
| 5 | 4 3 | 1 | [4] | 4 | 4 | 4 | 4 | 4 | 4 |
| CUMULATIVE TOTALS | 11 27 | 5 | 11 | 11 | 19 | 16 | 18 | 21 | 24 |
| | | 408 | 409 | 410 | 411 | 412 | 413 | 414 | 415 |

51 ARBITRATED VALUES → 52 CUMULATIVE SUMMING → 53 SUBTRACTION TO FORM ROUNDED VALUES

R1=3.5    S1=R1+0=3.5 → 4       R1'=S1−0=4
R2=3.5    S2=R1+R2=7.0 → 7      R2'=S2−S1=3
R3=3.0    S3=R1+R2+R3=10.0 → 10  R3'=S3−S2=3

R1=10.1   S1=R1+0=10.1 → 10           R1'=S1−0=10
R2=20.2   S2=R1+R2=30.3 → 30          R2'=S2−S1=20
R3=30.3   S3=R1+R2+R3=60.6 → 61       R3'=S3−S2=31
R4=39.4   S4=R1+R2+R3+R4=100.0 → 100  R4'=S4−S3=39

SYSTEM AND METHOD FOR ALLOCATING A PLURALITY OF RESOURCES BETWEEN A PLURALITY OF COMPUTING DOMAINS

RELATED APPLICATIONS

The present invention is a continuation-in-part of U.S. Pat. No. 7,140,020, entitled "DYNAMIC MANAGEMENT OF VIRTUAL PARTITION COMPUTER WORKLOADS THROUGH SERVICE LEVEL OPTIMIZATION," issued Nov. 21, 2006 which is a continuation-in-part of U.S. Pat. No. 7,228,546, entitled "DYNAMIC MANAGEMENT OF COMPUTER WORKLOADS THROUGH SERVICE LEVEL OPTIMIZATION," issued Jun. 5, 2007 which are incorporated herein by reference.

FIELD OF THE INVENTION

The present application is generally related to allocating a plurality of resources between a plurality of computing domains.

DESCRIPTION OF RELATED ART

Computer systems inherently have limited resources, particularly CPU resources. These limited resources must be allocated among the different applications operating within the system. A known allocation mechanism for allocating system resources to applications is a system known as a Process Resource Manager (PRM). It is used to partition the CPU resource and various other resources among the different applications. The PRM partitions the resources into fractions of the whole. The fractions or pieces are then assigned to groups of processes, which comprise applications. Each application would then receive some portion of the available resources.

Virtual machine technology (such as the ESX server product available from VMware) is another example of partitioning functionality. Virtualization software typically executes in connection with a host operating system of the physical server. The virtualization software creates virtual resources as software constructs. The virtual resources are then assigned to virtual machines. Specifically, the virtual resources are used to execute "guest" operating systems that execute on top of the host operating system. The guest operating systems are then used to execute applications. The assignment of the virtual resources to the virtual machines thereby allocates resources between the respective applications.

The PRM and similar assignment mechanisms are static mechanisms, meaning that the allocation configuration is fixed by an administrator, and can only be changed by an administrator. In other words, the administrator specifies where the partitions should lie. To configure the partitions, an administrator has to think in terms of the actual machine resources and the requirements of the different applications. Specifically, the administrator analyzes the lower level operations of the resources and applications to create the "shares" or fractions of system resources to be assigned to each application. Typically, an administrator will vary the configuration shares over time to determine an acceptable set of shares for the respective applications.

In an alternative mechanism, a priority based algorithm is employed to service applications according to a service queue. Specifically, each application is executed in a common computing environment. To control the execution of processes within the common computing environment, applications are placed in a queue to receive processing resources. Applications of high priority are serviced from the queue before lower priority applications. Also, in the priority based algorithm, the priorities of the applications can be varied to adjust processing performance.

SUMMARY

In an embodiment, a computing system comprises a plurality of resources, a first manager process for allocating the plurality of resources on a dynamic basis according to service level parameters, and a plurality of computing domains, wherein at least one application, a respective second manager process, and a respective performance monitor process are executed within each computing domain, and wherein the performance monitor generates performance data related to the execution of the at least one application and the second manager process requests additional resources from the first manager process in response to analysis of performance data in view of at least one service level parameter.

In another embodiment, a method comprises creating a plurality of computing domains, allocating a plurality of resources between the plurality of computing domains, executing at least one application, a manager process, and a performance monitor process in each of the plurality of computing domains, wherein the performance monitor process generates performance data related to the at least one application and the manager process requests additional resources in response to analysis of the performance data in view of at least one service level parameter, and dynamically reallocating the plurality of resources between the plurality of computing domains in response to received requests for additional resources according to service level parameters.

In another embodiment, a computer readable medium comprises code for generating performance data related to respective applications associated with a plurality of computing domains, code for requesting additional resources for ones of the plurality of computing domains in response to analysis of performance data from the code for generating in view of at least one service level parameter, and code for dynamically allocating resources between the plurality of computing domains in response to the code for requesting, wherein the code for dynamically allocating determines when to reallocate resources using service level parameters associated with applications of the plurality of computing domains.

DETAILED DESCRIPTION

Figure 1:
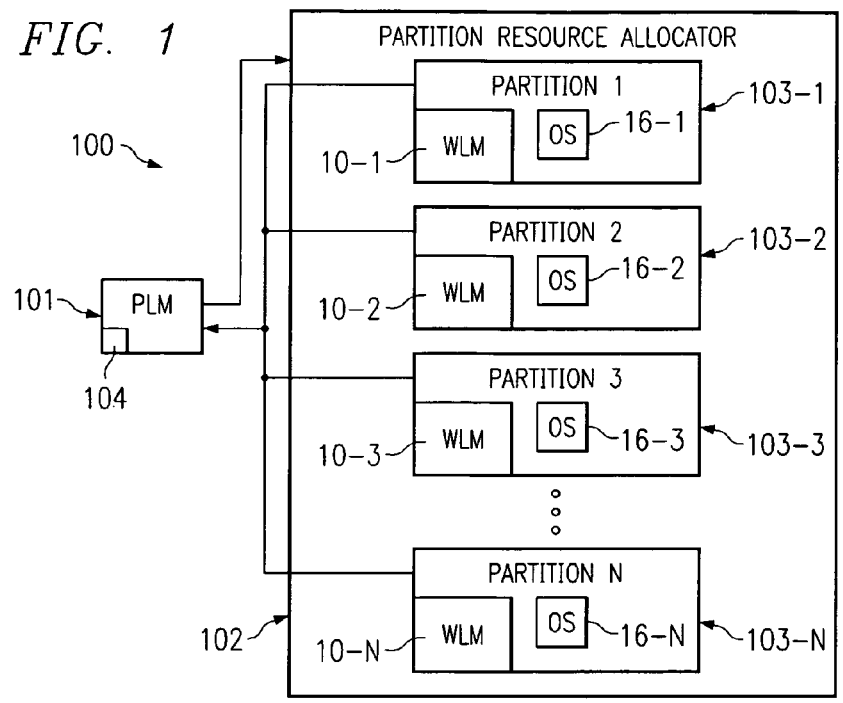
FIG. 1 depicts a partition load manager (PLM) operating with a plurality of partitions according to one representative embodiment.

Some representative embodiments dynamically respond to changes in workload characteristics in a computer system. The computer system may comprise a single small computer, e.g. a personal computer, a single large computer (e.g. an enterprise server), or a network of larger and/or small computers. The computers, particularly the large computers, or the network may be divided into protection domains or partitions. Each partition may be running its own operating system. An allocation mechanism of one embodiment preferably allows the administrator to think in terms of performance goals rather than computer system resources and requirements. Consequently, the administrator preferably defines a variety of performance goals with different priorities between them, and the allocation mechanism will preferably make any necessary adjustment of the resources. The goals can be preferably set without regard to partitions. For example, a goal for a database portion of the computer system could be that a retrieval transaction should not take more than 10 milliseconds. The allocation mechanism would then manipulate the resources to achieve this goal. For multiple partition computer systems, the resources may be manipulated within a partition, e.g. processor time being allocated among applications, or the resources may be manipulated between partitions, e.g. reassigning a processor from one partition to another (effectively resizing the partitions), or combination of both. In another embodiment, resources may be allocated between virtual machines by changing the entitlements associated with the various virtual machines as discussed in regard to FIG. 7. A scheduling agent may then schedule processor resources to threads associated with the virtual machines according to the entitlements of the virtual machines.

The allocation mechanism preferably includes a partition load manager (PLM) that receives resource request information from the partitions of the system. The PLM preferably examines the resource request information and compares the request information with the available resources. Based on the comparison, the PLM may increase, decrease, or leave unchanged, a particular partition's resources. If the performance of a partition is lagging, e.g., if transactions are taking longer than the goals, then the partition may request an increase in the resource entitlement from the PLM. If a partition is over-achieving, then the partition may inform the PLM that it has excess resources, and the PLM may decrease its entitlement and allocate it to another partition or partitions.

Each partition preferably includes a work load manager (WLM) which operates similarly to the PLM, but operates within a particular partition. An example WLM is more fully explained in U.S. application Ser. No. 09/493,753 entitled "DYNAMIC MANAGEMENT OF COMPUTER WORKLOADS THROUGH SERVICE LEVEL OPTIMIZATION," filed Jan. 28, 2000, which is hereby incorporated herein by reference. Each WLM also receives goal information and priority information from a user or administrator. Note that such goal and priority information may be the same for all partitions or the information may be specific to each partition or groups of partitions. The WLM also receives performance information from performance monitors, which are processes that monitor the performance of the applications and devices within the partition. The WLM examines the information from the performance monitors and compares the information with the goals. Based on the comparison, the WLM may increase, decrease, or leave unchanged, an application's entitlement. If the performance of an application is lagging, e.g., if transactions are taking longer than the goal, then the WLM increases the entitlement. If an application is over-achieving, then the WLM will decrease its entitlement and allocate it to another application.

The WLMs also interact with the PLM. Each WLM initially and periodically, after determining its resource needs, sends resource request information to the PLM. The PLM, after receiving such requests, then allocates system resources between the partitions. Each WLM, after receiving information about its partition resources, then allocates its allotted resources among the applications on its partition.

In multiple partition systems, the PLM may reside in one partition and have access to the other partitions. Alternatively, the PLM may reside in a service module that manages all of the partitions. Alternatively, the PLM may reside in each partition, and cooperatively allocate resources amongst themselves.

In one embodiment, the PLM allocates the resources between the different partitions, based on the priorities of the partitions and the resource requests. This movement of resources is referred to as re-sizing partitions. A partition, preferably through its WLM, maintains a list of prioritized application goals with an indication of the quantity of each required resource. Application goals of equal priority are treated equally. (Note that an application may have more than one goal.) The requests of higher priority application goals are satisfied before lower priority application goals. Unallocated resources may be held in reserve or assigned to a default partition. Note that applications of the default partition may always be exceeding their goals and thus require a rule that such a condition is not an event to cause reallocation of resources or resizing of partitions.

Note that the partition resource entitlements are no longer a fixed configuration. As a partition's needs change, some representative embodiments will automatically adjust partition entitlements based on resource availability and priority. Thus, some representative embodiments are dynamic. Also note that the administrator no longer has to estimate the initial entitlements as some representative embodiments will determine the correct resource allocation to achieve the stated goals, and the computer system using some representative embodiments will converge on certain partition entitlement values that achieve the stated performance goals. Further note that priorities can be assigned to the different goals. Consequently, different goals can be met based on system resources, e.g., with a high amount of resources, all goals can be met, however, with a lesser amount of resources the higher priority goal will be met before the lower priority goals. Further note that changes to the system can be made as soon as the PLM receives resource requests, and action by the system administrator is not required. Note that in multiple partition systems, the administrator may define and prioritize goals that apply across all of the partitions and the different operating system instances operating in the partitions, instead of only being applied within a single partition.

FIG. 1 depicts the various components of one representative embodiment in a multiple partition system having multiple partitions 103-1, 103-2, 103-3 . . . 103-N. Each partition may have one or more processors and other systems resources, e.g. storage devices, I/O devices, etc. Each partition is preferably running its own operating system 16-1, . . . 16-N, which provides segregation and survivability between the partitions. Note that the different partitions may have different amounts of resources, e.g. different numbers of processors. Also note that the partitions may be virtual, as the multiple partitions may reside in one or more physical computers.

Note that in an initial state the system may have the resources evenly divided among the partitions. Alternatively, the initial state of the system may provide only minimal resources to each partition, with the extra resources being held in reserve, for example, either unassigned or all placed into one or more partitions. The operations of PLM 101 and WLMs 10 will cause the system resources to be quickly allocated in a manner that is most efficient to handle the defined goals and priorities for the applications of each of the partitions.

The resources of the computer system are managed by PLM 101. PLM 101 receives resource requests from the different partitions. The requests can involve multiple priorities and multiple types of resources. For example, a request may state that the partition requires two processors and one storage device to handle all high priority applications, four processors and two storage devices to handle all high and medium priority applications, seven processors and five storage devices to handle all high, medium, and low priority applications. The requests originate from WLMs 10-1, . . . 10-N. WLMs 10 preferably produce the requests after totaling the resources necessary to activate their respective goals. After receiving one or more requests, PLM 101 preferably reviews system resources and determines if reallocation is necessary based on existing resources, current requests, and the priorities of the requests. Thus, if a particular partition has a change in resource requirements, PLM 101 will examine the existing requirements of the other partitions with the new requirements of the particular partition, as well as the current resources, to determine if reallocation is necessary. PLM 101 may also initiate reallocation after a change in system resources, e.g. a processor fails, or additional memory is added, etc.

PLM 101 preferably determines whether reallocation is necessary by examining the priorities of the resource request. A change in a high level request will typically cause reallocation. For example, if all device resources are consumed in handling high priority operations of the partitions, then a change in a low priority request would be ignored. On the other hand, a change in a high priority request, e.g. less resources needed, will cause reallocation of the resources, e.g. the excess resources from the oversupplied partition would be re-allocated among the other partitions based on the goals and priorities of their applications. PLM 101 then calculates a revised distribution of resources based on the goals and priorities of the applications of different partitions. The revised distribution is then delivered to partition resource allocator 102. Allocator 102 preferably operates to resize the partitions, which is to move resources from one or more partitions to one or more partitions based on the instructions provided by PLM 101. An example of such an allocator and partition resizing is described in U.S. application Ser. No. 09/562,590 entitled "RECONFIGURATION SUPPORT FOR A MULTI PARTITION COMPUTER SYSTEM," filed Apr. 29, 2000, the disclosure of which is hereby incorporated herein by reference.

Note that resizing may cause considerable overhead to be incurred by the system. In such a case, moving resources from one partition to another reduces the available computing time. Thus, determination by PLM 101 may include a threshold that must be reached before PLM 101 begins reallocation. The threshold may include multiple components, e.g. time, percent under/over capacity, etc. For example, a small over/under capacity may have to exist for a longer period of time before reallocation occurs, while a large over/under capacity may cause an immediate reallocation. This would prevent small, transient changes in resource need from causing reallocations in the system.

Figure 2:
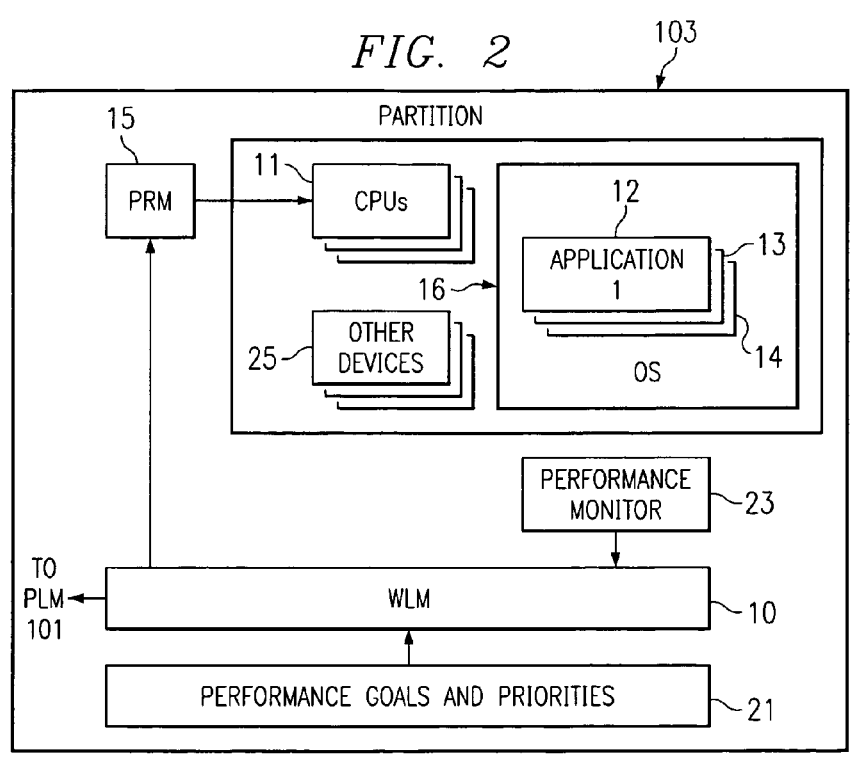
FIG. 2 depicts a partition of FIG. 1 according to one representative embodiment.

FIG. 2 depicts the various components of a partition according to one representative embodiment. Goals 21 preferably comprise a configuration file, which is defined by a user or system administrator, that describes the users preferences with regards to what characteristic(s) of the application is of interest and is being measured, what is the desired level of performance of the application in terms of the characteristic, and what is the priority of achieving this goal. A user can also specify time periods for a particular goal to be in effect. For example, a first application may be a first database and the user will specify in the configuration file that the characteristic is for a particular type of transaction to be completed within two seconds, and have a high priority. The application may also have a second goal for the same characteristic, e.g. the same type of transactions are to be completed within one half of a second, and have a low priority. A second application may be a second database which has a similar goal as that of the first database, namely for a particular type of transaction to be completed within two seconds, and have the same priority as the first database. Thus, resources would be allocated between the two applications, so that the high priority goals will be met, and any excess resources would be given to the first application so that it can meet the lower priority "stretch" goal.

WLM 10 preferably receives performance information which describes the status of a particular characteristic or characteristics of each application 12, 13, 14 that is being monitored. WLM 10 also receives performance information which describes the status and/or other characteristics of the processors 11 and other devices 25 (e.g. I/O, storage, etc.) contained within partition 103.

The performance information is preferably supplied by performance monitor 23. As shown in FIG. 2, a single monitor is capable of handling multiple applications and devices, however, a different embodiment of the present invention may have multiple monitors, each monitoring one or more applications and devices. Performance monitor 23 is a small program that gathers specific information about the application and/or device. For example, if the application is a database, then a performance monitor measures access times for the database. As another example, if a device is a hard drive, then the performance monitor may measure data capacity. The information need not be strictly application performance; it can be any measurable characteristic of the workload (e.g. CPU usage). This information is being gathered continuously while the system is operating. The workload manager will sample the information at some interval specified by the administrator.

The output of the workload manager, derived from the ongoing performance reported by the monitors and given the goals by the user, is preferably periodically applied to PRM 15. The output of WLM 10 is the share or entitlement allocation to the different resources that is assigned to each application. For example, each share may approximately equate to $1/100$ of a CPU operating second. Thus, within a second, an application having an entitlement of 10 will receive $1/10$ of the second, provided that the application has at least one runable process. Note that the time received may not be consecutive, but rather may be distributed across the one second interval. Note that a share may also equate to other parameters based on the resource being allocated, e.g. a percent of disk storage space or actual number of bytes of disk storage space.

The partition may have multiple numbers of resources, e.g. multiple CPUs and/or multiple storage devices. Thus, the allocation can be placed all on one device or spread among the devices. For example, if a system contains four processors and an allocation of twenty percent of all processor resources is made, thirty percent of a first processor, ten percent of a second processor, twenty percent of a third processor, and twenty percent of a four processor may satisfy the total allocation. The allocation among the different devices is determined by the PRM 15. PRM 15 will move the application around to various devices, as needed to attempt to ensure that it achieves twenty percent allocation.

WLM 10 also preferably sends resource requests to PLM 101. These requests may take the form of a list that describes the resources required for partition 103 to meet its goals for its different priorities. PLM 101 may then decide to reallocate resources based on a request. PLM 101 may store the different requests, which would permit PLM 101 to view the changes in the requested resources. This would allow PLM 101 to anticipate changes in resources. For example, over a period of time, PLM 101 may realize that a particular partition always has a need for more resources at a particular time (or following a particular event), e.g. at four p.m., and thus PLM 101 may reallocate resources to that particular partition before the partition sends a request. The storing of requests would also allow for the setting of reallocation triggering criteria. A simple trigger could be used that compares a single message with the current resource allocation, e.g. a requested increase/decrease of 5% or greater of the current allocation resources would trigger reallocation. More complex triggers could be used that refer to the stored messages. For example, requests from a particular partition for increase/decrease of 2% to <5% of the current allocation resource that continue for more than one hour will cause reallocation.

Figure 3:
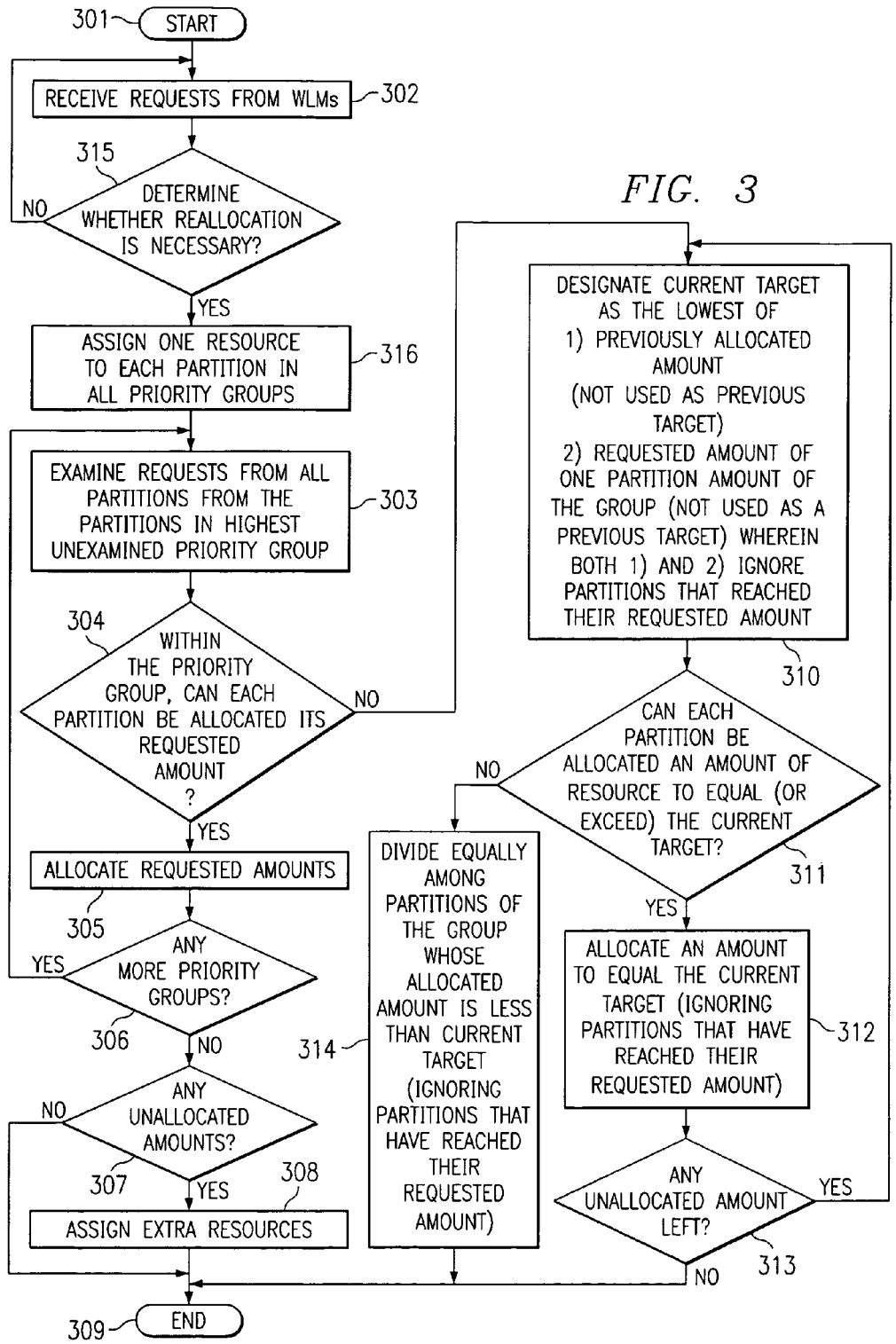
FIG. 3 depicts a flow chart of the operations of the PLM of FIG. 1 according to one representative embodiment.

In one representative embodiment, PLM 101 may operate according to flow chart 300 shown in FIG. 3. PLM 101 starts operations 301 and receives 302 the resource requests from WLMs. PLM 101 then optionally determines whether to initiate reallocation 315. PLM 101 may compare the resource requests with the current allocations. If a particular partition has a request (for more or less resources) that exceeds a predetermined threshold, as compared with a current allocation, then PLM 101 may initiate reallocation. Also, PLM 101 may compare a plurality of such requests from each partition, which have been accumulated over time, to determine whether there is a chronic overage/underage of resources. For example, suppose a difference of 10% between requested resources (either overage or underage) and current resources will cause an immediate reallocation to occur, while a 9% difference will cause reallocation if the difference (9% or higher) occurs in two consecutive requests (or for 10 minutes), while a 8% difference (8% or higher) will cause reallocation if the difference occurs in three consecutive requests (or for 15 minutes), etc. If PLM 101 determines that reallocation should occur, then PLM 101 proceeds with block 316, and if not then PLM 101 returns to block 302.

In block 316, PLM 101 preferably assigns all partitions with the value 1 (hereinafter meaning a minimal allotment of devices, e.g. one CPU, one I/O, one block of memory, etc.). The extra resources may be assigned to a default partition or held in reserve as unassigned. Alternatively, PLM 101 may evenly divide up the resources between the partitions.

In block 303, PLM 101 then preferably examines the requests for resources needed to handle the highest application priority group of the partitions. It determines 304 whether the requested amount for each partition within the priority group can be satisfied. If so, then PLM 101 facilitates allocation 305 of the requested entitlement by sending the allocation information to the partition resource allocator 102. Note that several messages may be sent, with one or more for each application priority level and/or partition. Alternatively, one message may be sent at the end 309, which lays out the complete allocation of the resources for all partitions. If not, then PLM 101 preferably arbitrates between the different partitions in a fair manner, as discussed with respect to block 310. After satisfying each partition with the application priority group in block 305, PLM 101 then determines 306 whether there are any more application priority groups. If so, then PLM 101 returns to block 303 and repeats. If not, then PLM determines 307 whether any unallocated resources remain. If not, then PLM 101 is finished 309. The allocated resource information is sent to the partition resource allocator, and PLM 101 is finished for this iteration. After receiving new requests, PLM 101 will begin again in block 301. If block 307 determines that resources are available, then PLM 101 may assign the remaining resources (block 308) to a default partition, designate the resources as unassigned and hold them in reserve (hoarding), or divide the remaining resources equally among one or more of the partitions. Note that hoarding may allow some representative embodiments to operate in a more efficient manner, as the assignment of extra resources may cause the partitions to overachieve their respective goals, and consequently cause further reallocations, unless a rule is used to prevent such reallocations. Then PLM 101 ends 309.

If PLM 101 determines in block 304 that the requested amount for each partition within the application priority group cannot be satisfied, then PLM 101 preferably arbitrates between the different partitions in a fair manner. For example, by designating 310 a current target value as the lowest value of (1) the lowest of any previously allocated amounts, wherein the previously allocated amounts have not been previously used for a target value, or (2) the lowest requested amount of one partition of the priority group, which has not been used for a previous target value. Note that criteria (1) and (2) do not include partitions that have reached their requested amounts, as this will simplify the performance flow of PLM 101 as depicted in FIG. 3 (namely, by reducing the number of times that blocks 310, 311, 312, and 313 are repeated). In block 311, PLM 101 determines whether the target amount for each partition within the application priority group can be satisfied. If not, then the allocation amount may be equally divided 314 among different partitions of the application priority group whose allocations are less than the current target, but excluding partitions that already met or exceeded the target level. PLM 101 then ends 309. If so, then PLM 101 allocates 312 sufficient resources to bring the resource allocation value of each partition up to the target level. Partitions that already meet or exceed the target level are not changed. PLM 101 then determines 313 whether any unallocated resources remain. If not, then PLM 101 ends 309. If so, then PLM 101 returns to block 310 to determine a new current target level and repeats the process until PLM 101 ends 309.

Note that the distribution of block 314 is by way of example only, as the remaining amount may be held in reserve, assigned to one or several default partitions, and/or allocated to one or more partitions according to another rule.

Figures 4A, 4B, 5A:
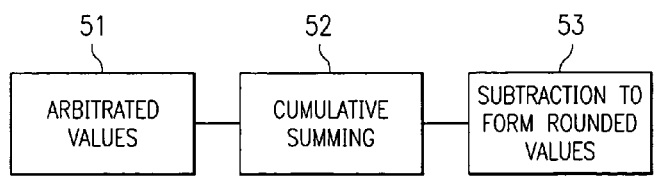
FIGS. 4A and 4B depict examples of allocation of resources by the PLM of FIG. 1 according to one representative embodiment.
FIGS. 5A, 5B, and 5C depict the operation of the rounder of the PLM of FIG. 1 according to one representative embodiment.

FIG. 4A depicts an example of the operation of PLM 101 according to one representative embodiment. As shown in FIG. 4A, there are six partitions that have different requirements for four levels of priority. Note only one resource type is shown for simplicity as different types of resources exist, and each partition may have different requirements for the different types of resources. As shown, partition 1 requires 1 resource to handle priority 1 applications or processes, as well as priority 2 and 3 applications or processes, and 3 resources to handle priority 4 applications or processes. The other partitions have their requirements as shown. These resources can be a single processor, a group of processors, I/O devices, memory (e.g. RAM, ROM, etc.), storage devices (optical discs, hard drives, etc.), connection bandwidth to other devices and/or systems (e.g. Internet, intranet, LAN, WAN, ethernet etc.), etc, but also may be any device, application, program or process that can be allocated between and/or among different one or more partitions of a multiple partition system.

Note that the values used to express the requirements are shown as incremental values of the resources by way of example only, as other values could be used. For example, for storage devices (RAM, ROM, hard drives, etc.), the requirements could be shown as megabytes, or as a number of hard drives. Processors could be shown as percentages, shares, or as normalized values. Note that some computer systems may be able to use fractional values, with resources being split between partitions. If the computer system cannot handle fractional values (no splitting resources), then rounding errors or inequities may occur in the allocation of the resources.

FIG. 4A also depicts the allocation operation of PLM 101 on the requests. Note that the total needed for all partitions is 21 for the fourth level, while a total of 19 resources exists in the system. Thus, not all partitions will have their priorities satisfied according to the fourth level. After a time period, the partitions send resource requests to PLM 101, as shown in table form in FIG. 4A. PLM 101 then may determine that reallocation is necessary (see block 315 of FIG. 3) and begins a fair allocation of the resources. Note that additional resources being added to the system, e.g. another processor is added, can also cause reallocation. Similarly, resources being removed from the system, e.g. a I/O device fails, could also cause reallocation.

PLM 101 begins by providing each partition with minimal resources to operation, wherein each partition is assigned 1 resource (see block 316 of FIG. 3) as shown in column 401. For example, each partition must have at least one processor, a block of memory, and one I/O device to operate. PLM 101 may send the resource information to the partition resource allocator 102 or wait until the reallocation has completed before sending the resource information to the partition resource allocator 102.

PLM 101 then determines whether each partition can receive its requested resource amount for priority 1 (see block 304 of FIG. 3). In this case, these amounts can be allocated, as there are 13 remaining resources. As shown in column 402, partitions 3 and 5 would each receive 1 additional resource (see block 305 of FIG. 3). The other partitions are satisfied from the initial allocation.

Since there are additional priority groups (see block 306 of FIG. 3), PLM 101 repeats for priority 2. PLM 101 can again allocate the requested amounts, since 11 resources remain. Thus, as shown in column 403, partitions 2 and 3 would receive two more resources, while partition 5 would receive one more resource.

Since there are additional priority groups, PLM 101 repeats for priority 3. PLM 101 can again allocate the requested amounts, since 6 resources remain. Thus, as shown in column 404, partitions 2 and 5 would receive one more resource.

Since there are additional priority groups, PLM 101 repeats for priority 4. PLM 101 cannot allocate the requested amounts, because only 4 resources remain and 6 additional resources are associated with priority 4. (Note that partition 4 would like a total of 3 resources and has already been allocated 1 resource, and thus only needs two more.) Therefore, PLM 101 would then follow the 'no' path as shown in block 304 of FIG. 3. The previously allocated amounts for the current step are 1 and 4, while the requested amounts are 1, 3, 4, and 5. The current target would be designated as 1, which is the lowest value of a requesting partition, as well as the lowest value of a previously allocated amount. Since each partition has at least 1 resource, no additional resources are allocated in this cycle, as shown in column 405. Note that partitions 3 and 6 have reached their requested amounts. Since additional resources remain (see block 313 of FIG. 3), a new target is designated, i.e. 3 (lowest target not previously used). Partitions 1 and 4 each receive additional resources, while partitions 2 and 5 remain unchanged, as shown in column 406. Note that partitions 1 and 4 have reached their requested amounts. The allocated amounts would be provided to the partition resource allocator 102 as the resource allocation information. The allocator 102 would then manipulate the resources of the partitions.

FIG. 4B depicts another example of the operation of PLM 101 according to one representative embodiment. As shown in FIG. 4B, there are five partitions that have different requirements for two levels of priority. Note only one resource type is shown for simplicity as different types of resources exist, and each partition may have different requirements for the different types of resources. As shown, partition 1 requires 1 resource to handle priority 1 applications or processes, and 9 resources to handle priority 2 applications or processes. The other partitions have their requirements as shown. Note that partition 5 needs 4 resources for priority 1, but only 3 resources for priority 2. In such a case, the higher priority request preferably is satisfied.

FIG. 4B also depicts the allocation operation of PLM 101. Note that the total needed for all of the partitions is 27 for the second priority level, while a total of 24 resources exist in the system. Thus, not all partitions will have their priorities satisfied according to the second priority level. After a time period, the partitions send resource requests to PLM 101, as shown in table form in FIG. 4B. PLM 101 then may determine that reallocation is necessary (see block 315 of FIG. 3) and may begin a fair allocation of the resources.

PLM 101 begins by providing each partition with minimal resources to operate, wherein each partition is assigned 1 resource in accordance with block 316 of FIG. 3 as shown in column 408. PLM 101 then determines whether each partition can receive its requested resource amount for priority 1 (see block 304 of FIG. 3). In this case, these amounts can be allocated. As shown in column 409, partitions 3 and 5 would each receive 3 additional resources (see block 305 of FIG. 3). Note that partition 5 has reached its requested amount. The other partitions are satisfied from the initial allocation.

Since there are additional priority groups (see block 306 of FIG. 3), PLM 101 repeats for priority 2. PLM 101 cannot allocate the requested amounts. Therefore, PLM 101 would then follow the 'no' path of block 304 of FIG. 3. The previously allocated amounts are 1 and 4, while the requested amounts are 2, 3, 5, 8, and 9. The current target would be designated as 1, which is the lowest value of a set comprising the requested amount and the previously allocated amount. Since each partition has at least 1 resource, no additional resources are allocated in this cycle, as shown in column 410. Since additional resources remain (see block 313 of FIG. 3), a new target is designated, i.e. 2. Partitions 1, 2, and 4 each receive an additional resource, as shown in column 411. Note that partition 4 has reached its requested amount. Since additional resources remain, a new target is designated, i.e. 3. Partitions 1 and 2 each receive an additional resource, as shown in column 412. Since additional resources remain, a new target is designated, i.e. 4. Partitions 1 and 2 each receive an additional resource, as shown in column 413. Since additional resources remain, a new target is designated, i.e. 5. Partitions 1, 2, and 3 each receive an additional resource, as shown in column 414. Note that partition 3 has reached its requested amount. Since additional resources remain, a new target is designated, i.e. 8. The remaining resources cannot be allocated to meet the new target (see block 311 of FIG. 3). Thus, the remaining resources are allocated according to block 314 of FIG. 3. For example, the remaining resources can be equally divided among the partitions that have not yet received their requested allocations as described in block 314 of FIG. 3. Thus, the 3 remaining resources are divided among partitions 1 and 2, with each partition receiving 1.5 resources. The allocated amounts would be provided to the partition resource allocator 102 as the resource allocation information. The allocator 102 would then manipulate the resources of the partitions.

Figures 5B, 5C, 6:
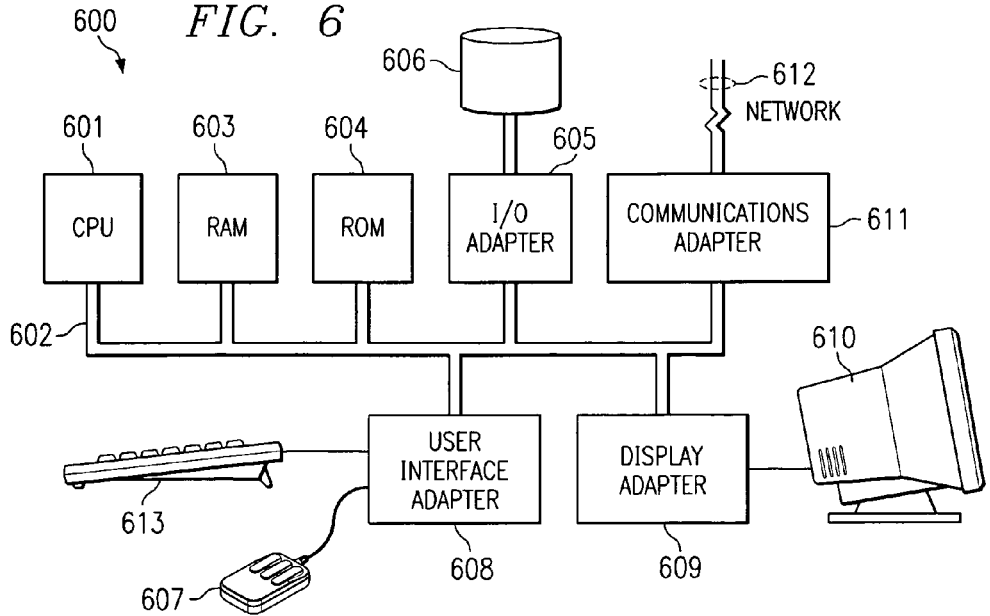
FIG. 6 depicts a block diagram of a computer system which is adapted to use one representative embodiment.

As described above, if resource values are used that are not representative of whole resource units and the system cannot handle fractionalize units, e.g. one processor, then rounding errors may occur. In one representative embodiment, PLM 101 would handle such errors as shown in FIG. 5A, and as illustrated in the examples of FIGS. 5B and 5C. FIG. 5A depicts the operation of the rounder portion 104 of PLM 101. The above examples have used integer values for the requests, and thus result in allocation values that are also integers, however fractional numbers or floating point numbers may be used, e.g. an allocation value of 10.1. Also, floating point numbers may also result from block 314 of FIG. 3 (for example dividing 3 resources among two partitions results in 1.5 resources for each partition. Some systems may only operate with allocated values that are integer, thus fractional values of resources will need to be rounded up or down. This is also true when allocating incremental resources such as processors, hard drives, etc., in resizing partitions where whole resources need to be allocated. The rounder 104 first receives (block 51) the allocated values from PLM 101, which are the values resulting from the operation of FIG. 3. The rounder then cumulatively sums (block 52) the values for each received allocated value by adding prior allocated values to each received allocated value. The rounder then forms the rounded allocation values by subtracting (block 53) each cumulative sum with the prior cumulative sum. For example, as shown in FIG. 5B, three partitions have allocated values of R1=3.5, R2=3.5, and R3=3.0. The rounder forms S1 by adding R1 and 0 (note that step may be modified such that S1 is assigned the value of R1) and then rounding wherein fractional values of greater than or equal to 0 and strictly less than 0.5 are rounded down to zero and fractional values of greater than or equal to 0.5 are rounded up to one. Similarly, the rounder forms S2 by adding R2+R1 and rounding, and forms S3 by adding R3+R2+R1 and rounding. Note that any fractional values are being accumulated into the subsequent sums (before rounding), i.e. S1 has 0.5, S2 has 1.0, and S3 also has 1.0 (before rounding). The rounder forms the rounded allocated values, by subtracting the sums with the previous sum. Specifically, R1'=S1 (or S1−0), R2'=S2−S1, and R3'=S3−S2. Note that the rounding up occurs in the first value, as this is where the accumulated fractional value has equaled or exceeded 0.5. These rounded values would then be sent to the partition resource allocator 102.

FIG. 5C is another example of rounding where four partitions have allocated values of R1=10.1, R2=20.2, R3=30.3, and R4=39.4. The rounder forms S1 by S1=R1 (or R1+0) and rounding, forms S2 by S2=R2+R1 (or R2+S1) and rounding, forms S3 by S3=R3+R2+R1 (or R3+S2) and rounding, and forms S4 through S4=R4+R3+R2+R1 (or R4+S3) and rounding. Note that any fractional values are being accumulated into the subsequent sums (before rounding), i.e. S1 has 0.1, S2 has 0.3, S3 has 0.6, and S4 has 1.0 (before rounding). The rounder forms the rounded allocated values, by subtracting the sums with the previous sum. Specifically, R1'=S1 (or S1−0), R2'=S2−S1, R3'=S3−S2, and R4'=S4−S3. Note that the rounding up occurs in the third value, as this is where the accumulated fractional value has equaled or exceeded 0.5. Note that the rounding is order dependent. Consequently, the ordering of the partitions determines which partition will receive the rounding. For example, give the following fractional values of 0.4, 0, and 0.1, the third application with 0.1 will receiving the rounding up, as this accumulation value is the one that equals or exceeds 0.5, and not the larger fractional value of 0.4. If the partition were re-ordered to 0, 0.1, and 0.4, then the third application with 0.4 would receive the rounding. Note that rounding does not cause significant perturbations according to one representative embodiment, i.e. causing over/under achievements of the goals, unless the allocated values are very small. In that case, increasing a small value by 1 would represent a large change in the percentage and may cause over/under achievement. For example, suppose an allocated value of 2.1 is rounded up to 3. This represents a value that is 143% larger than the allocated value. Such a large difference may cause over/under achievement.

Further note that the allocation mechanism shown in FIG. 3 and illustrated with examples shown in FIGS. 4A to 4B, is designed such that each partition having an application priority group will receive generally equal treatment. Alternatives can be developed. For example, PLM 101 could be programmed to attempt to maximize the number of partitions that receive their request amount. This would starve some of the partitions having applications with the same application priority group, particularly the larger requesting partitions, so that others, namely the smaller requesting partitions, will be satisfied. Another alternative is to have partitions receive an amount that is proportional to the difference between their allocated amount and their requested amount. When an application priority level is reached where there is an insufficiency in the available resources versus the requested resources, then allocating an amount that is proportional for the difference would put each partition at the same fractional point. This would minimize the number that receive the amount they are asking for because, none of the partitions would receive the whole amount they are requesting (subject to rounding), they would all be scaled by their respective differences. The advantage of the mechanism of FIG. 3 is that no partition is sensitive to any other partition (with larger requirements) at the same priority or lower priority. Note that a smaller requesting partition may reduce a higher resource partition, of equal priority, until their respective allocations become equal. If a higher priority partition starts requesting more resources, then the partitions with lower priorities will lose resources, but if a partition at the same priority starts requesting more resources, then this partition can reduce only the resources of its co-priority partitions if its entitlement is smaller than theirs. Thus, co-priority partitions are protected from each other. With the alternative mechanisms described above, a particular partitions' allocations will be affected as the request of their co-priority partitions are changing.

When implemented in software, the elements of some representative embodiments are essentially the code segments to perform the necessary tasks. The program or code segments can be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, intranet, etc.

FIG. 6 illustrates computer system 600 adapted to use one representative embodiment. Central processing unit (CPU) 601 is coupled to system bus 602. The CPU 601 may be any general purpose and the present invention is not restricted by the architecture of CPU 601 as long as CPU 601 supports the inventive operations as described herein. Bus 602 is coupled to random access memory (RAM) 603, which may be SRAM, DRAM, or SDRAM. ROM 604 is also coupled to bus 602, which may be PROM, EPROM, or EEPROM. RAM 603 and ROM 604 hold user and system data and programs as is well known in the art.

Bus 602 is also coupled to input/output (I/O) controller card 605, communications adapter card 611, user interface card 608, and display card 609. I/O card 605 connects to storage devices 606, such as one or more of hard drive, CD drive, floppy disk drive, tape drive, to the computer system. Communications card 611 is adapted to couple the computer system 600 to a network 612, which may be one or more of local (LAN), wide-area (WAN), ethernet or Internet network. User interface card 608 couples user input devices, such as keyboard 613 and pointing device 607, to the computer system 600. Display card 609 is driven by CPU 601 to control the display on display device 610.

Although some representative embodiments have been described in terms of allocating physical resources between partitions, representative embodiments may allocate resources between any suitable computing domain. Another suitable computing domain is a virtual machine. For example, virtualization refers to the creation of virtual machines that coexist on one or several physical servers. Virtualization software typically executes in connection with a host operating system of the physical server. The virtualization software creates virtual resources as software constructs. The virtual resources are then assigned to virtual machines used for respective servers. Specifically, the virtual resources are used to execute "guest" operating systems that execute on top of the host operating system. The guest operating systems are then used to execute applications. Furthermore, each guest operating system operates independently. A software fault associated with any particular guest operating system and its application(s) may be contained within a given virtual machine. An example of a physical server platform and suitable virtualization software is the ProLiant server platform available from Hewlett-Packard Company executing the VMware ESX Server software product.

Figure 7:
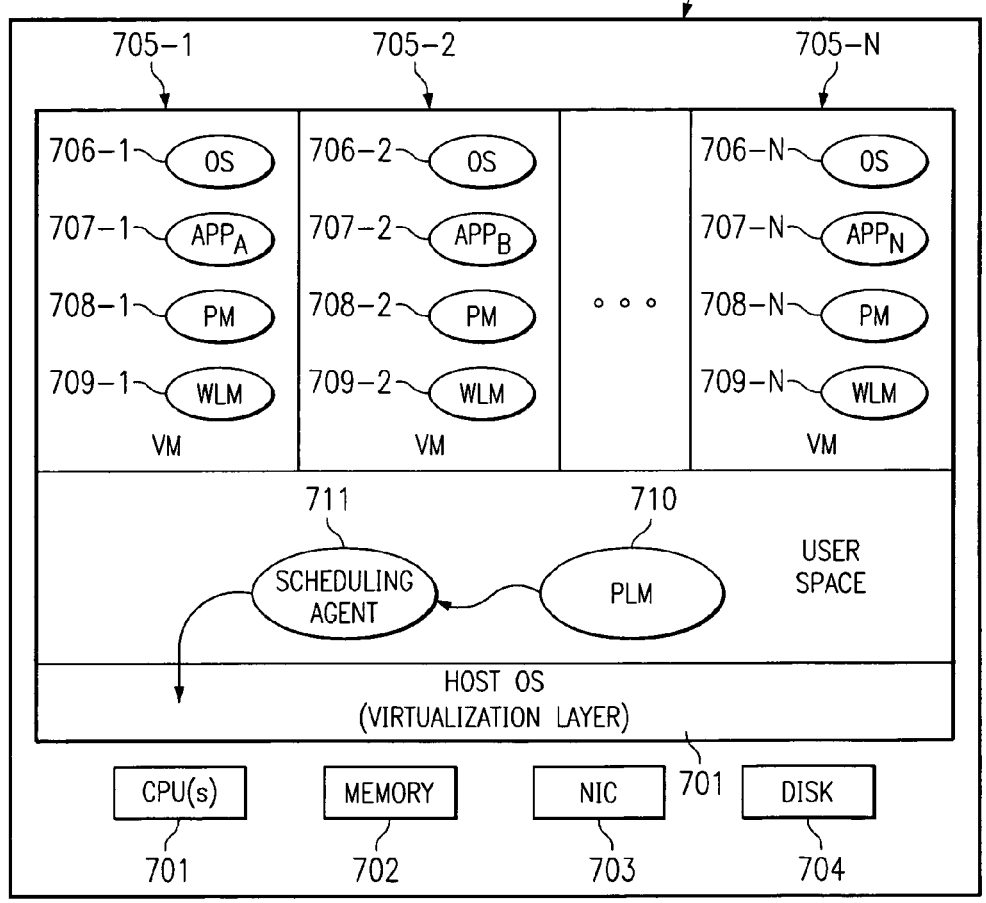
FIG. 7 depicts another system adapted according to one representative embodiment.

FIG. 7 depicts system 700 that allocates virtual resources according to one representative embodiment. System 700 may comprise a plurality of physical resources such as CPUs 701, memory 702, network interface card (NIC) 703, disk storage 704, and/or the like. System 700 includes host operating system 701. Host operating system 701 enables low level access to physical resources 701-704. Additionally, host operating system 701 includes a software layer that virtualizes the physical resources 701-704 to enable allocation of those resources to higher level software processes. The virtualization software layer may be implemented within the kernel of host operating system 701 as an example.

System 700 further includes virtual machines 705-1 through 705-N. Virtual machines 705-1 through 705-N appear to software processes executing within the virtual machines to be physical server platforms. Virtual machines 705-1 through 705-N provide partition and isolation functionality. A software fault within any particular virtual machine 705 may only affect the respective virtual machine 705, while software processes associated with the other virtual machines 705 may continue operations in an ordinary manner. Within virtual machines 705, respective guest operating systems (OS) 706-1 through 706-N may be executed. Additionally, one or several applications (shown as 707-1 through 707-N) may be executed within each virtual machines 705. Performance monitors 708-1 through 708-N generate performance data related to applications 707. The performance data may be gathered directly from applications 707 and/or from operating systems 706.

When an application 707 is not achieving one or several SLOs, WLM 709 may detect the condition by analyzing the generated performance data. The SLOs may be encoded using service level parameters similar to those shown in FIGS. 4A and 4B. In response to detecting such a condition, a respective WLM 709 may request additional resources from PLM 710. In one embodiment, PLM 710 is a software process that operates in the user space associated with host operating system 801. PLM 710 compares requests for additional resources against SLOs and the current allocation of virtual resources between virtual machines 705-1 through 705-N. If a reallocation is determined to be appropriate, PLM 710 may reallocate resources by communicating a suitable message to scheduling agent 711. Scheduling agent 711 may reassign resources by making a system call to the virtualization layer of host operating system 701. Scheduling agent 711 may perform functions similar to the functions of PRM 15. For example, scheduling agent 711 may reassign time slices of processors between virtual machines 705 to perform the desired reallocation. In one embodiment, the reassignment of time slices may occur by adjusting scheduling parameters associated with the threads used to execute virtual machines 705.

It shall be appreciated that system 700 is by way of example only. For example, the virtualization software layer may be implemented by a user space application instead of within the kernel of host operating system 701. PLM 710 and scheduling agent 711 need not be implemented within the user space associated with host operating system 701. Additionally, each virtual machine 705 need not necessarily be subject to dynamic allocation of resources. A subset of virtual machines 705 may have a fixed allocation of resources if appropriate for the software processes associated with those virtual machines 705. Accordingly, PM 708 and WLM 709 may also be omitted from a subset of virtual machines 705 depending upon application characteristics.

Some representative embodiments may provide a number of advantages. For example, some representative embodiments enable the allocation of virtual resources to occur on a dynamic basis. Also, the dynamic allocation of resources may occur in response to performance data related to respective applications. Accordingly, as peak load occurs for a respective application, additional virtual resources may be allocated to that application. The additional resources, such as additional time slices of one or several processors, enable the respective application to service additional application transactions. Furthermore, the use of service level objectives or application goals to manage resource allocation enables system administrators to configure server systems in an efficient manner.

What is claimed is:

1. A computing system, comprising:
a plurality of resources;
a computer readable storage medium having instructions stored therein for executing a first manager process for allocating said plurality of resources to a plurality of computing domains on a dynamic basis according to service level parameters; and
at least one application, a respective second manager process, and a respective performance monitor process are executed within each computing domain, wherein said respective second manager process maintains a list comprising a plurality of application priority levels for said at least one application and an indication of a quantity of said plurality of resources needed to meet said at least one level of said plurality of application priority levels and wherein said performance monitor generates performance data related to the execution of said at least one application and said second manager process requests additional resources from said first manager process in response to analysis of performance data in view of at least one service level parameter.

2. The computing system of claim 1 wherein said plurality of computing domains are virtual machines.

3. The computing system of claim 2 wherein said first manager process operates on a host operating system of said computing system.

4. The computing system of claim 3 wherein a respective operating system executes on top of said host operating system for each of said plurality of computing domains.

5. The computing system of claim 3 wherein said first manager process allocates said plurality of resources between said plurality of computing domains by assigning virtual resources to said plurality of computing domains through system calls to a kernel of said host operating system.

6. The computing system of claim 1 wherein said plurality of resources comprise at least one processor.

7. The computing system of claim 6 wherein said first manager allocates time slices of said at least one processor between multiple computing domains of said plurality of computing domains.

8. A method, comprising:
creating a plurality of computing domains;
allocating a plurality of resources between said plurality of computing domains by a first manager process;
executing at least one application, a second manager process, and a performance monitor process in each of said plurality of computing domains, wherein said second manager process maintains a list comprising a plurality of application priority levels for said at least one application and an indication of a quantity of said plurality of resources needed to meet said at least one level of said application priority levels and wherein said performance monitor process generates performance data related to said at least one application and said second manager process requests additional resources from the first manager process in response to analysis of said performance data in view of at least one service level parameter; and
dynamically reallocating said plurality of resources between said plurality of computing domains by the first manager process in response to received requests for additional resources according to service level parameters.

9. The method of claim 8 wherein said creating a plurality of computing domains comprises:
creating multiple virtual machines from a single server platform using a virtualization software layer.

10. The method of claim 9 wherein said virtualization software layer is implemented within a host operating system of said single server platform.

11. The method of claim 10 wherein said dynamically reallocating is performed by a process executing on top of said host operating system.

12. The method of claim 10 further comprising:
executing a respective guest operating system on top of said host operating system for each of said multiple virtual machines.

13. The method of claim 10 wherein said dynamically reallocating comprises:
performing system calls to said host operating system to reassign virtual resources.

14. The method of claim 10 wherein said performing system calls reassigns time slices associated with at least one processor.

15. A computer readable storage medium having computer readable code stored thereon when executed by a processor perform a method comprising:
creating a plurality of computing domains;
allocating, by a first manager process, a plurality of resources between said plurality of computing domains;
generating, by a performance monitor process, performance data related to respective applications associated with a plurality of computing domain;
requesting, by a second manager process, additional resources for ones of said plurality of computing domains from the first manager process, in response to analysis of performance data from said generating in view of at least one service level parameter and an indication of a quantity of resources needed to meet said at least one service level parameter; and
dynamically allocating, by the first manager process, resources between said plurality of computing domains in response to said requesting, wherein said dynamically allocating determines when to reallocate resources using service level parameters associated with applications of said plurality of computing domains.

16. The computer readable storage medium of claim 15, wherein said plurality of computing domains are virtual machines.

17. The computer readable storage medium of claim 16 wherein said code for dynamically allocating performs calls to a software virtualization layer to reassign resources between said plurality of computing domains.

18. The computer readable storage medium of claim 16 wherein said code for dynamically allocating performs system calls to a host operating system to reassign resources between said plurality of computing domains.

19. The computer readable storage medium of claim 15 wherein said resources comprise processors.

20. The computer readable storage medium of claim 19 wherein said code for dynamically allocating reassigns time slices of said processors between said plurality of computing domains.

* * * * *

UNITED STATES PATENT AND TRADEMARK OFFICE
CERTIFICATE OF CORRECTION

PATENT NO. : 7,748,005 B2
APPLICATION NO. : 10/938961
DATED : June 29, 2010
INVENTOR(S) : Francisco Romero et al.

It is certified that error appears in the above-identified patent and that said Letters Patent is hereby corrected as shown below:

In column 16, line 33, in Claim 15, delete "domain;" and insert -- domains; --, therefor.

Signed and Sealed this
Twenty-eighth Day of December, 2010

David J. Kappos
*Director of the United States Patent and Trademark Office*